United States Patent
Miller

(10) Patent No.: US 11,267,393 B2
(45) Date of Patent: Mar. 8, 2022

(54) VEHICULAR ALERT SYSTEM FOR ALERTING DRIVERS OF OTHER VEHICLES RESPONSIVE TO A CHANGE IN DRIVING CONDITIONS

(71) Applicant: Magna Electronics Inc., Auburn Hills, MI (US)

(72) Inventor: Patrick A. Miller, Grand Blanc, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/929,648

(22) Filed: May 14, 2020

(65) Prior Publication Data

US 2020/0361366 A1 Nov. 19, 2020

Related U.S. Application Data

(60) Provisional application No. 62/848,683, filed on May 16, 2019.

(51) Int. Cl.

| | |
|---|---|
| *B60Q 1/46* | (2006.01) |
| *G08G 1/16* | (2006.01) |
| *B60Q 1/30* | (2006.01) |
| *B60R 11/04* | (2006.01) |
| *G08G 1/04* | (2006.01) |
| *B60R 11/00* | (2006.01) |

(52) U.S. Cl.
CPC ............... *B60Q 1/46* (2013.01); *B60Q 1/30* (2013.01); *B60R 11/04* (2013.01); *G08G 1/04* (2013.01); *G08G 1/16* (2013.01); *B60R 2011/0026* (2013.01)

(58) Field of Classification Search
CPC . B60Q 1/525; B60Q 1/36; B60Q 1/46; G08G 1/16
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,587,186 B2 | 7/2003 | Bamji et al. |
| 6,674,895 B2 | 1/2004 | Rafii et al. |
| 6,678,039 B2 | 1/2004 | Charbon |
| 6,690,268 B2 | 2/2004 | Schofield et al. |
| 6,690,354 B2 | 2/2004 | Sze |
| 6,693,517 B2 | 2/2004 | McCarthy et al. |
| 6,710,770 B2 | 3/2004 | Tomasi et al. |
| 6,825,455 B1 | 11/2004 | Schwarte |
| 6,876,775 B2 | 4/2005 | Torunoglu |
| 6,906,793 B2 | 6/2005 | Bamji et al. |
| 6,919,549 B2 | 7/2005 | Bamji et al. |
| 7,038,577 B2 | 5/2006 | Pawlicki et al. |
| 7,053,357 B2 | 5/2006 | Schwarte |

(Continued)

*Primary Examiner* — Benyam Haile
(74) *Attorney, Agent, or Firm* — Honigman LLP

(57) ABSTRACT

A vehicular alert system includes a control disposed at a vehicle, the control including a processor for processing potential hazard data received by the control. The control, responsive to receiving potential hazard data, determines the vehicle is approaching a hazard. The control, responsive to determining the equipped vehicle is approaching the hazard, alerts another vehicle of the approaching hazard at least by actuating hazard lights of the equipped vehicle.

20 Claims, 2 Drawing Sheets

(56) References Cited

U.S. PATENT DOCUMENTS

| | | |
|---|---|---|
| 7,124,027 B1 | 10/2006 | Ernst, Jr. et al. |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,425,889 B2 | 9/2008 | Widmann et al. |
| 7,580,795 B2 | 8/2009 | McCarthy et al. |
| 7,720,580 B2 | 5/2010 | Higgins-Luthman |
| 7,855,755 B2 | 12/2010 | Weller et al. |
| 8,013,780 B2 | 9/2011 | Lynam |
| 8,027,029 B2 | 9/2011 | Lu et al. |
| 9,688,199 B2 | 6/2017 | Koravadi |
| 9,729,636 B2 | 8/2017 | Koravadi et al. |
| 9,881,220 B2 | 1/2018 | Koravadi |
| 10,032,369 B2 | 7/2018 | Koravadi |
| 10,046,800 B2 | 8/2018 | Hu et al. |
| 10,347,129 B2 | 7/2019 | Koravadi |
| 2005/0000738 A1 | 1/2005 | Gehring et al. |
| 2006/0244579 A1 | 11/2006 | Raab |
| 2007/0067081 A1 | 3/2007 | Ton |
| 2009/0072956 A1 | 3/2009 | Kalous |
| 2010/0245066 A1 | 9/2010 | Sarioglu et al. |
| 2011/0298603 A1 | 12/2011 | King et al. |
| 2012/0062743 A1 | 3/2012 | Lynam et al. |
| 2012/0218412 A1 | 8/2012 | Dellantoni et al. |
| 2013/0222592 A1 | 8/2013 | Gieseke |
| 2014/0172239 A1 | 6/2014 | Vergara et al. |
| 2014/0218529 A1 | 8/2014 | Mahmoud et al. |
| 2014/0375476 A1 | 12/2014 | Johnson et al. |
| 2015/0124096 A1 | 5/2015 | Koravadi |
| 2015/0158499 A1 | 6/2015 | Koravadi |
| 2015/0203026 A1 | 7/2015 | Schotanus |
| 2015/0251599 A1 | 9/2015 | Koravadi |
| 2015/0344030 A1 | 12/2015 | Damerow et al. |
| 2015/0352953 A1 | 12/2015 | Koravadi |
| 2016/0036917 A1 | 2/2016 | Koravadi et al. |
| 2016/0210853 A1 | 7/2016 | Koravadi |
| 2016/0347310 A1* | 12/2016 | Moran ............. G08G 1/16 |
| 2017/0113683 A1 | 4/2017 | Mudalige et al. |
| 2017/0158133 A1 | 6/2017 | Chundrlik, Jr. et al. |
| 2017/0254873 A1 | 9/2017 | Koravadi |
| 2017/0330464 A1* | 11/2017 | Yoo ............. B60T 7/22 |
| 2018/0024564 A1 | 1/2018 | Matsuda |
| 2018/0053413 A1 | 2/2018 | Patil et al. |
| 2018/0082315 A1 | 3/2018 | Smid et al. |
| 2018/0105182 A1 | 4/2018 | Kim et al. |
| 2018/0127024 A1 | 5/2018 | Pourrezaei Khaligh et al. |

* cited by examiner

VEHICULAR ALERT SYSTEM FOR ALERTING DRIVERS OF OTHER VEHICLES RESPONSIVE TO A CHANGE IN DRIVING CONDITIONS

CROSS REFERENCE TO RELATED APPLICATION

The present application claims the filing benefits of U.S. provisional application Ser. No. 62/848,683, filed May 16, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of sensors in vehicle sensing systems is common and known. Such sensors are integrated at the vehicle and may sense areas rearward of the vehicle to assist the driver in reversing the vehicle.

SUMMARY OF THE INVENTION

The present invention provides an alert system for a vehicle that receives potential hazard data, and that provides a control that includes a processor for processing the potential hazard data received by the control. The control, responsive to receiving the potential hazard data, determines the vehicle is approaching a hazard and alerts another vehicle of the approaching hazard.

These and other objects, advantages, purposes and features of the present invention will become apparent upon review of the following specification in conjunction with the drawings.

DESCRIPTION OF THE PREFERRED EMBODIMENTS

A driver assist system and/or alert system operates to receive potential hazard data. The system may capture image data exterior of the vehicle and may process the captured image data to display images and/or to detect objects at or near the vehicle and in the predicted path of the vehicle to gather potential hazard data. The system includes an image processor or image processing system that is operable to receive image data from one or more cameras and process the image data to determine objects or vehicles present in the field of view of the camera(s) and/or provide an output to a display device for displaying images representative of the captured image data.

Figure 1:
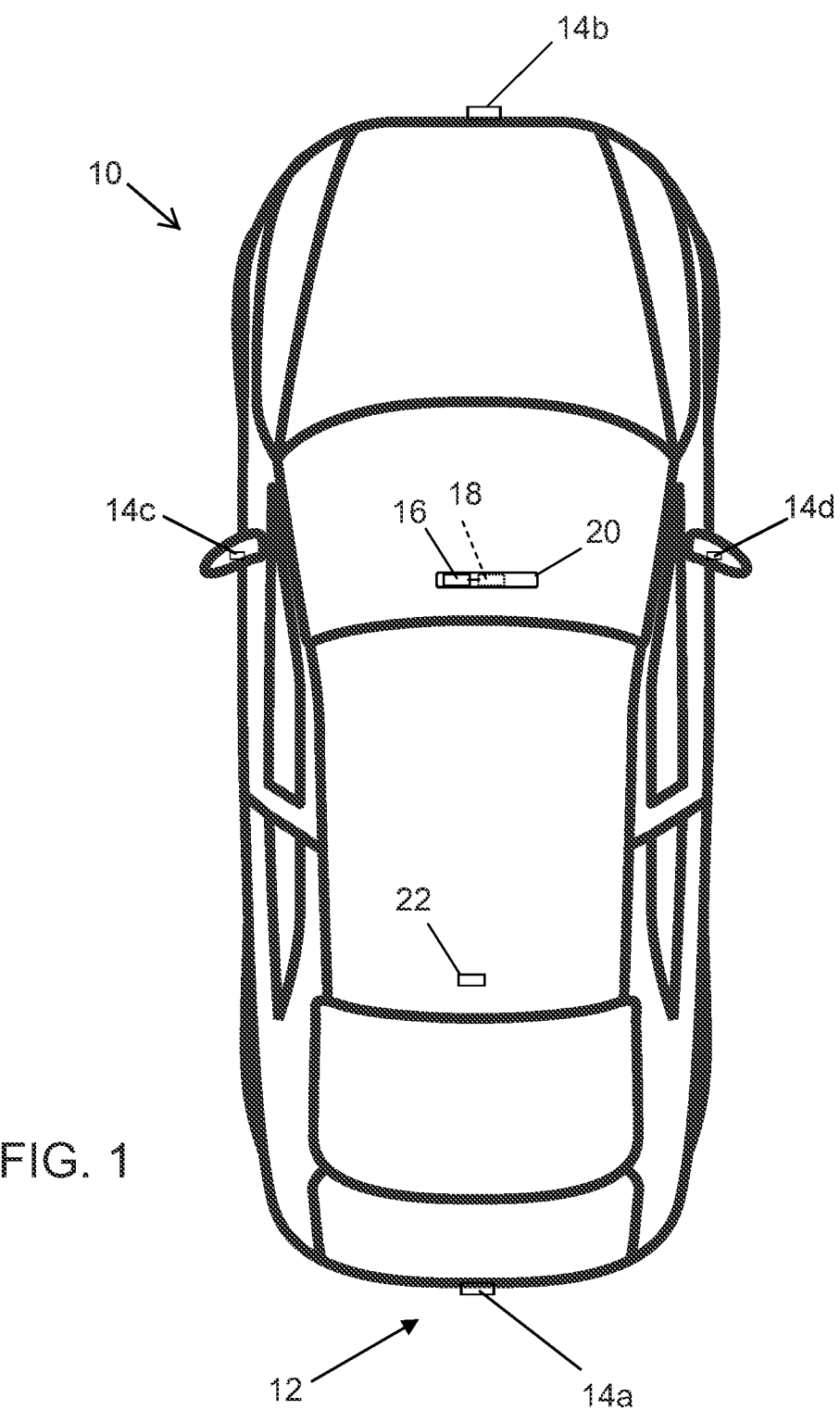
FIG. 1 is a plan view of a vehicle with a vision system that incorporates cameras and/or radar sensors and/or other sensors in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 that comprises electronic circuitry and associated software, with the electronic circuitry including an image processor or data processor that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle. The system 12 may include at least one antenna 22 for receiving wireless data from external sources (e.g., 3G or 4G or 5G data).

When performing an abrupt or unexpected traffic maneuver in a vehicle (e.g., aggressively braking) due to unexpected traffic or road conditions, it may be advantageous to alert or warn other vehicles about the unexpected traffic or road conditions. For example, a driver may engage his or her hazard lights (such as by pressing a hazard light switch in the vehicle that causes flashing of the brake lights, including the center high-mounted stop lamp (CHMSL), side indicator lights and the like) when braking for heavy traffic in order to alert drivers behind the vehicle of the drastic change in traffic flow.

Figure 2:
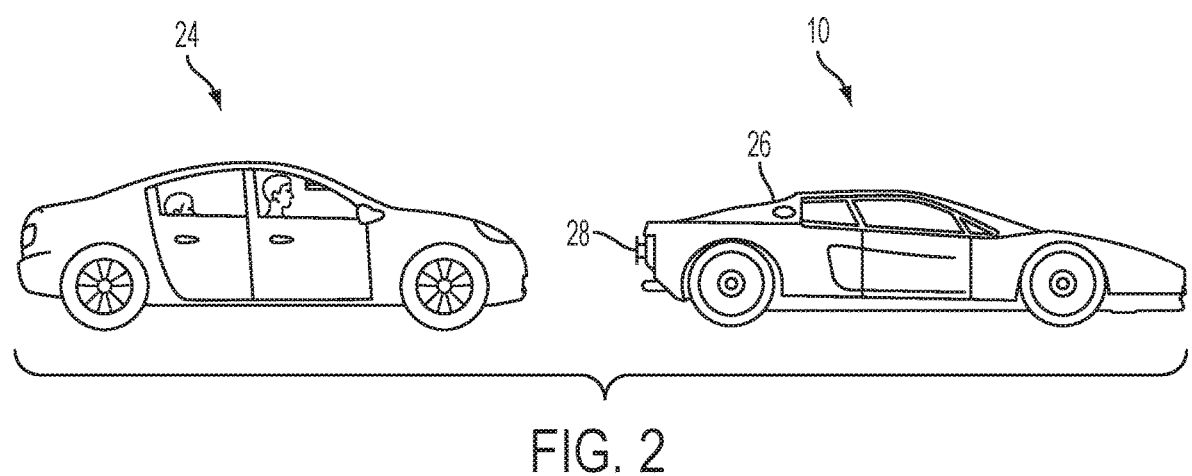
FIG. 2 is a plan view of the vehicle of FIG. 1 alerting another vehicle in accordance with the present invention.

Referring now to FIG. 2, the control 18 of the alert system equipped at the vehicle 10 receives information (i.e., potential hazard data) regarding upcoming traffic (e.g., traffic density, traffic speed, etc.) and/or road conditions (e.g., weather information, road construction/closures, etc.). For example, the control of the vehicle receives potential hazard data regarding icy roads, traffics jams, or obstacles in the road. The control may receive this information from, for example, a wireless data connection (e.g., a 3G or 4G or 5G data connection via antenna 22) and/or via object detection via processing of image data captured by one or more cameras 14 at the vehicle 10 and/or via object detection via processing of sensor data captured by another sensor or sensors, such as radar, lidar, or ultrasonic sensors. The control may also receive data from other sources. For example, the control may receive vehicle speed, vehicle acceleration/deceleration, steering wheel angle, GPS data, etc.

The control 18 determines, from the received potential hazard data, hazards that the vehicle 10 may be approaching. For example, the control 18 may determine that the vehicle is approaching stopped traffic or icy roads or other objects or obstacles on the road. In another example, the control, from processing image data, may detect stopped traffic ahead. In some implementations, a threshold amount of deceleration or braking or change in vehicle speed may be an additional input for the control. Abrupt changes in steering (i.e., to avoid an obstacle in the road) may be a further input. In other examples, the control determines that traffic has been stopped from traffic information received via the wireless data connection.

In response to determining the hazard from processing the potential hazard data, the control 18 alerts the driver of the vehicle 10 and/or drivers of nearby vehicles (e.g., vehicle 24) of the hazard. For example, the control 18 may flash brake lights 26 or engage hazard lights 28 (such as the center high-mounted stop lamp (CHMSL) and/or rear and side indicator lights and the like) of the vehicle to alert drivers of other vehicles. This may be especially helpful when traffic behind the vehicle 10 (e.g., vehicle 24) can see the vehicle 10, but cannot see the determined hazard, such as, for instance, when a bend in the road (or the vehicle itself) obscures the hazard from the trailing vehicle 24. In other implementations, the control 18 generates an alert for the driver of the equipped vehicle 10. For example, an audible alert (e.g., using integrated speakers of the vehicle 10) and/or a visual display on an integrated display of the vehicle.

Optionally, the vehicle may receive potential hazard information from other vehicles (e.g., via a vehicle to vehicle communication system). The vehicle may alert the driver and/or other drivers of other vehicles of the hazard. For example, a vehicle stopped by traffic could communicate the traffic stoppage to a second vehicle approaching the traffic stoppage but not yet at the traffic stoppage or within the driver's view of the traffic stoppage. The second vehicle may communicate the traffic stoppage to a third vehicle trailing the second vehicle via wireless communication, brake lights, hazard lights, etc.

Thus, the system of the present invention alerts drivers of the equipped vehicle and/or nearby (e.g., trailing) vehicles to the presence of upcoming hazards. The system may use GPS (or other navigation data), traffic information, or other sensor data (e.g., cameras, radar, vehicle speed, etc.) to determine the presence of upcoming hazards. The system may then audibly or visually alert drivers of the upcoming hazard. For example, the system may automatically engage the hazard lights of the vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/ or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular alert system, the vehicular alert system comprising:
a control disposed at a vehicle equipped with the vehicular alert system, the control comprising a processor for processing potential hazard data received by the control;
wherein, while the equipped vehicle is travelling along a road, the control receives (i) potential hazard data via wireless communication from a leading vehicle in front of and in the direction of travel of the equipped vehicle and (ii) a driver input indicative of a potential hazard;
wherein the control, responsive to receiving the potential hazard data from the leading vehicle and the driver input from the driver of the vehicle, determines whether or not the equipped vehicle is approaching a hazard; and
wherein the control, responsive to determining the equipped vehicle is approaching the hazard, visually alerts a trailing vehicle behind the equipped vehicle of the approaching hazard at least by actuating hazard lights of the equipped vehicle.

2. The vehicular alert system of claim 1, wherein the control visually alerts the trailing vehicle by flashing a brake light of the equipped vehicle.

3. The vehicular alert system of claim 1, further comprising a camera disposed at the equipped vehicle and viewing exterior and forward of the equipped vehicle, wherein image data captured by the camera and provided to the control is processed at the control to determine that the equipped vehicle is approaching the hazard.

4. The vehicular alert system of claim 3, wherein the camera is disposed at and behind an in-cabin surface of a windshield of the equipped vehicle and views through the windshield forward of the equipped vehicle.

5. The vehicular alert system of claim 1, further comprising a radar sensor disposed at the equipped vehicle and sensing exterior of the equipped vehicle, and wherein radar data captured by the radar sensor and provided to the control is processed at the control to determine that the equipped vehicle is approaching the hazard.

6. The vehicular alert system of claim 1, wherein the potential hazard data comprises traffic information.

7. The vehicular alert system of claim 6, wherein the traffic information comprises traffic speed.

8. The vehicular alert system of claim 7, wherein the traffic information indicates that traffic ahead of the equipped vehicle has slowed or stopped.

9. The vehicular alert system of claim 1, wherein the potential hazard data comprises GPS information.

10. The vehicular alert system of claim 1, wherein the potential hazard data comprises weather information.

11. The vehicular alert system of claim 1, wherein the control alerts the trailing vehicle of the hazard via wireless communication.

12. A vehicular alert system, the vehicular alert system comprising:
a camera disposed at a vehicle equipped with the vehicular alert system, the camera viewing exterior and forward of the equipped vehicle;
a control disposed at the equipped vehicle, the control comprising a processor for processing image data captured by the camera and provided to the control;
wherein, while the equipped vehicle is travelling along a road, the control receives (i) potential hazard data via wireless communication from a leading vehicle in front of and in the direction of travel of the equipped vehicle and (ii) image data from the camera indicative of a potential hazard;
wherein the control, responsive to receiving the potential hazard data from the leading vehicle and the image data captured by the camera, determines the equipped vehicle is approaching slowed or stopped traffic ahead of the equipped vehicle; and
wherein the control, responsive to determining the equipped vehicle is approaching the slowed or stopped traffic ahead of the equipped vehicle, visually alerts a trailing vehicle behind the equipped vehicle of the approaching slowed or stopped traffic ahead of the equipped vehicle at least by actuating hazard lights of the equipped vehicle.

13. The vehicular alert system of claim 12, wherein the control visually alerts the trailing vehicle by flashing a brake light of the equipped vehicle.

14. The vehicular alert system of claim 12, wherein the camera is disposed at and behind an in-cabin surface of a windshield of the equipped vehicle and views through the windshield forward of the equipped vehicle.

15. The vehicular alert system of claim 12, further comprising a radar sensor disposed at the equipped vehicle and sensing exterior of the equipped vehicle, and wherein radar data captured by the radar sensor and provided to the control is processed at the control to determine that the equipped vehicle is approaching the slowed or stopped traffic ahead of the equipped vehicle.

16. The vehicular alert system of claim 12, wherein the control alerts the trailing vehicle of the slowed or stopped traffic ahead of the equipped vehicle via wireless communication.

17. A vehicular alert system, the vehicular alert system comprising:
a radar sensor disposed at a vehicle equipped with the vehicular alert system and sensing exterior of the equipped vehicle;
a control disposed at the equipped vehicle, the control comprising a processor for processing sensor data received from the radar sensor and potential hazard data received by the control;

wherein, while the equipped vehicle is travelling along a road, the control receives (i) potential hazard data via wireless communication from a leading vehicle in front of and in the direction of travel of the equipped vehicle and (ii) sensor data from the radar sensor indicative of a potential hazard;

wherein the control, responsive to receiving the potential hazard data from the leading vehicle and the sensor data, determines whether or not the equipped vehicle is approaching a hazard; and wherein the control, responsive to determining the equipped vehicle is approaching the hazard, visually alerts a trailing vehicle behind the equipped vehicle of the approaching hazard at least by actuating hazard lights and brake lights of the equipped vehicle.

18. The vehicular alert system of claim 17, wherein the hazard comprises slowed or stopped traffic ahead of the equipped vehicle.

19. The vehicular alert system of claim 17, wherein the hazard comprises an object in the lane the equipped vehicle is travelling in.

20. The vehicular alert system of claim 17, wherein the control alerts the trailing vehicle of the hazard via wireless communication.

* * * * *